United States Patent [19]

Irwin

[11] 4,335,232

[45] Jun. 15, 1982

[54] OPTICALLY ANISOTROPIC MELT FORMING POLYESTERS

[75] Inventor: Robert S. Irwin, Wilmington, Del.

[73] Assignee: E. I. Du Pont de Nemours and Company, Wilmington, Del.

[21] Appl. No.: 281,200

[22] Filed: Jul. 7, 1981

[51] Int. Cl.³ .................. C08G 63/02; C08G 63/18
[52] U.S. Cl. .................................. 528/128; 528/125; 528/191; 528/193; 528/194; 528/220; 528/271
[58] Field of Search ............ 528/125, 128, 191, 193, 528/220, 271

[56] References Cited

U.S. PATENT DOCUMENTS

| | | | |
|---|---|---|---|
| 4,067,852 | 1/1978 | Calundann | 528/193 |
| 4,083,829 | 4/1978 | Calundann | 528/193 |
| 4,130,545 | 12/1978 | Calundann | 260/40 P |
| 4,161,470 | 7/1979 | Calundann | 260/40 P |
| 4,232,143 | 11/1980 | Irwin | 528/128 |
| 4,269,965 | 5/1981 | Irwin | 528/128 |

*Primary Examiner*—Lester L. Lee

[57] ABSTRACT

Fiber-forming aromatic polyester consisting essentially of 1,4-dioxyphenylene units, lower alkyl or halo-1,4-dioxyphenylene units, terephthaloyl units and 3-carbonyl-4'-oxybenzophenone or 4-carbonyl-4'-oxybenzophenone units or chloro- and/or methyl substituted homologs of these.

9 Claims, No Drawings

OPTICALLY ANISOTROPIC MELT FORMING POLYESTERS

BACKGROUND OF THE INVENTION

1. Field of the Invention

This invention relates to fiber-forming, melt-spinnable wholly aromatic copolyesters prepared from hydroquinone, chloro- or methylhydroquinone, terephthalic acid and a carboxy-hydroxybenzophenone. The invention includes filaments of the polyester prepared from optically anisotropic melts and having high modulus in the as-spun condition and high tenacity after heat treatment.

2. Description of the Prior Art

Aromatic copolyesters capable of forming anisotropic melts and containing units derived from hydroquinone, chlorohydroquinone or methylhydroquinone and terephthalic acid have been disclosed in prior art patents U.S. Pat. Nos. 4,118,372; 4,075,262; 3,991,014, 4,066,620; 3,991,013; 4,146,702, 4,156,070 and 4,256,624. In each case a third component is incorporated to reduce the melt flow temperature so that melt spinning can be accomplished without polymer degradation.

Polyesters made entirely from carboxy-hydroxy-benzophenones are disclosed in U.S. Pat. No. 3,531,435. There is no disclosure of copolymers wherein the benzophenone derivative is a minor constituent (i.e., less than 50 mole %).

More recently in U.S. Pat. No. 4,232,144 units derived from 3-carboxy-4-hydroxy-benzophenone are disclosed in combination with units derived from 4-hydroxy-benzoic acid, hydroquinone and terephthalic acid to provide melt-spinnable polyesters. In U.S. Pat. No. 4,232,144 the units derived from 4-hydroxy-benzoic acid are present in major amounts.

SUMMARY OF THE INVENTION

The present invention is directed to melt-spinnable copolyesters of fiber-forming molecular weight that exhibit optical anisotropy in the melt and consist essentially of Units I, II, and IIIA or IIIB having the structural formulas:

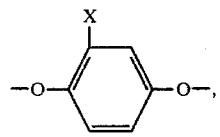   I

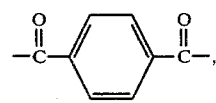   II

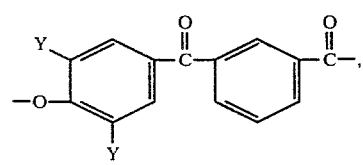   IIIA or

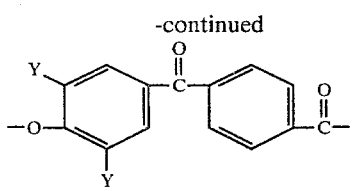   IIIB where X is selected from the group consisting of hydrogen, halo- (preferably chloro-) or lower alkyl (preferably methyl), Y is selected from the group consisting of hydrogen, chloro- or methyl and wherein said polyesters comprise from about 25 to 45 mole % of Unit I, from about 25 to 45 mole % of Unit II and from about 10 to 50 mole % of Unit IIIA or IIIB. In each case the number of dioxy units in the polyester is substantially equal to the number of dicarbonyl units.

The preferred copolyesters of the invention consist essentially of Units I, II and IIIA or IIIB with the proviso that when Unit IIIB is present, X is halo- or 1-4 carbon lower alkyl and Units I and II are each present in the proportion of from 37.5-45 mole % with Unit IIIB constituting the remaining units;

when Unit IIIA is present and X is hydrogen, Units I and II are each present in the proportion of from 27.5-32.5 mole % with Unit IIIA constituting the remaining units; and when Unit IIIA is present and X is halo- or 1-4 carbon lower alkyl, Units I and II are each present in the proportion of from 25-45 mole % with Unit IIIA constituting the remaining units;

in each case, moles of Unit I being substantially equal to moles of Unit II. The preferred halo- and lower alkyl units are chloro- and methyl, respectively. Melt-spun and heat-strengthened filaments of such polyesters are included in the invention.

DETAILED DESCRIPTION OF THE INVENTION

The copolyesters of the invention consist essentially of units I, II and IIIA or IIIB. Unit I is 1,4-dioxyphenylene, lower alkyl- or halo-1,4-dioxyphenylene and is preferably provided by the hydroquinone, methyl- or chloro-hydroquinone in the form of the diacetates. Unit II is the terephthaloyl radical and is normally provided by terephthalic acid. Unit IIIA is 3-carbonyl-4'-oxybenzophenone, or its chloro- or methyl substituted derivative, for example, 3-carbonyl-3'-methyl-4'-oxy-benzophenone, derived from 3-carboxy-3'-methyl-4'-hydroxy-benzophenone. Unit IIIB is 4-carbonyl-4'-oxybenzophenone or its chloro- or methyl substituted derivative, for example, 4-carbonyl-3'-methyl-4'-oxy-benzophenone, and is derived from 4-carboxy-3'-methyl-4'-hydroxybenzophenone. The Unit III precursors are usually employed as acetates. Small amounts of other divalent aromatic polyester forming units such as 1,3-dioxyphenylene and isophthaloyl may be present to enhance processing or to lower melting point of the copolyesters.

The number of dioxy units, e.g., Unit I, present in the copolyester is substantially equivalent to the number of dicarbonyl units, e.g., Unit II. Mole % is calculated on the basis of total moles of units present, i.e. [I+II+(IIIA or IIIB)+other divalent aromatic polyester forming units].

The precursor reactants are generally combined in proportions corresponding to the molar proportions of the units desired in the copolyester products except that it is preferred to use up to 7 mole % excess, indicated in the examples as (7%) of the diacetate of hydroquinone, methyl- or chlorohydroquinone. Functional equivalents of the precursors may be employed.

Conventional polymerization techniques may be employed such as described in the aforementioned U.S. Pat. No. 4,118,372 and more particularly in the examples described below. In general, a mixture of monomers is heated with stirring, under nitrogen in a 250 ml 3-necked flask or polymerization tube in a Wood's metal bath or other suitable heating medium from approximately 250° C. to 330°–380° C. Polymerization is continued for up to a total of 0.5 to one hour or longer if necessary until a polymer of fiber-forming molecular weight is obtained. Usually a vacuum is applied to obtain a final product with high molecular weight. The copolyesters of the invention exhibit optical anisotropy in the melt as described in the U.S. Pat. No. 4,118,372.

FILAMENT PREPARATION

The polyesters of the invention are spun into filaments by conventional melt-spinning techniques without substantial degradation. In the examples below, filaments were prepared by melt-spinning into a quenching atmosphere of air or nitrogen and collected at a windup speed specified in the example. The spinneret employed had a single capillary (hole) shaped as a right circular cylinder 0.23 mm in diameter and usually 0.46 mm long. "Melt temperature" is the temperature at which the melt was maintained (values in parentheses are temperatures of the spinnerets). Melt pumping speed is adjusted to give the approximate linear density (D) shown in the tables at the stated windup speeds.

As used herein, the term "as-spun fiber" refers to a fiber which has not been drawn or heat treated after extrusion and normal windup.

HEAT TREATMENT AND UTILITY

Following collection, samples of undrawn (as-spun) monofilament were heat-treated in essentially relaxed condition in an oven as taught in Luise U.S. Pat. No. 4,183,895. Heating was in a nitrogen atmosphere with temperature increased in stages. Typically, temperature was raised from room temperature to 200° C. in 2 hours, then to 304° C. in another 7 hours, and finally maintained at 304° C. for an additional 7 hours. Such a heating sequence is abbreviated as RT-200° C./2 hr+200°–304° C./7 hr+304° C./7 hr The heat-treated fibers of this invention are useful for a variety of industrial applications such as in ropes and cables, and in reinforcement of plastic composites or of rubber as in tires and V-belts.

TEST METHODS

Inherent viscosity ($n_{inh}$) was computed from $$n_{inh} = \ln(n_{rel})/C$$

where $n_{rel}$ is the relative viscosity and C is a solution concentration in grams of polymer per deciliter of solvent. Relative viscosity is the ratio of polymer solution flow time to solvent flow time in a capillary viscometer at 30° C. The solvent employed was either (A) a mixture of 7.5% trifluoroacetic acid/17.5% methylene chloride/12.5% dichlorotetrafluoroacetone hydrate/12.5% perchloroethylene/50% p-chlorophenol (all percentages by volume), or (B) pentafluorophenol. The concentration in (A) was 0.5 g/dl and in (B) was 0.1 g/dl.

The polymers were characterized by "stick temperature" meaning the temperature of a thermal-gradient hot bar at the point at which the polymer first began to stick as it was pressed to the bar at progressively higher temperatures.

Monofilament tensile properties were measured using a recording stress-strain analyzer at 70° F. (21.1° C.) and 65% relative humidity. Gauge length was 1.0 in (2.54 cm), and rate of elongation was 10%/min. Results are reported as D/T/E/M or T/E/M where D is linear density in tex units, T is break tenacity in dN/tex, E is elongation-at-break expressed as the percentage by which initial length increased, and M is initial tensile modulus in dN/tex. Since linear density is normally substantially unchanged by heat-treatment, it is reported only for the as-spun filament. Average tensile properties for five filament samples are reported.

Fibers of this invention have high initial moduli as spun (i.e., above 200 dN/tex) and high tenacity after heat-treatment.

The preparation of 3-carboxy-4'-acetoxybenzophenone from isophthalic acid and phenol is described in U.S. Pat. No. 4,232,144. The 4-carboxy-4'-acetoxy-benzophenone is prepared in a similar manner from terephthalic acid and phenol. The lower alkyl and halo substituted derivatives are made by a similar process.

EXAMPLES

The same general procedure was used in all the examples. It should be understood that the results reported below are believed to be representative and do not constitute all the runs involving the indicated reactants. In one such run, the inferior result obtained was attributed to unfamiliarity with the reaction requirements of the system, to impure reactants or inappropriate heat treatment conditions.

In the examples, the diacetate of the dihydric phenols and the monoacetate of the carboxyhydroxy benzophenone was used. The terephthalic acid was used as such rather than as esters or other derivatives.

The monomer ingredients were added in substantially the same molar ratios as desired in the final polymer except that an excess (usually 5 to 7%) of acetylated dihydric phenol was generally used. The resultant polymer is identified, for example, as CHQ/TPA/3,4'CHB (44.4/44.4/11.1) meaning it contained 44.4 mole % of 1,4-dioxy-chloro-1,4-phenylene units, 44.4 mole % of terephthaloyl units and 11.1 mole % of 3-carbonyl-4'-oxy benzophenone units (excesses of diacetates are not included in these percentages).

The 3-necked flask or polymer tube was fitted with: (1) a glass stirrer extending through a pressure-tight resin bushing, (2) a nitrogen inlet, and (3) a short column leading to a water- or air-cooled condenser with a flask for collecting acetic acid by-product. An attachment for application of vacuum was provided at the end of the condenser. An electrically heated Wood's metal bath or a boiling liquid vapor bath mounted for vertical adjustment was used for heating. The reaction mixture was heated to increasing temperatures with stirring at atmospheric pressure under nitrogen purge until essentially all the acetic acid had evolved. Then, vacuum was applied and pressure was reduced gradually from atmospheric to less than 1 mm of mercury (133.3 Pa). Heating under vacuum at less than 1 mm mercury pressure was then continued until viscosity had increased to a level believed satisfactory for melt-spinning. The cooled and solidified polymer was comminuted, and a portion was molded into a cylindrical plug for melt spinning.

EXAMPLE 1

Filaments From Copolyesters of Chlorohydroquinone (CHQ), Terephthalic Acid (TPA) and 3-Carboxy-4'-hydroxy-benzophenone (3,4'-CHB) or 4-Carboxy-4'-hydroxy-benzophenone (4,4'-CHB)

| | Polymerization Ingredients | | | | |
|---|---|---|---|---|---|
| | | Grams | | | Mole % |
| Ex. | CHQ | TPA | 3,4'-CHB | 4,4'-CHB | CHQ/TPA,3,4'-CHB/4,4'-CHB |
| A | 27.00(5%) | 18.70 | 10.65 | 0 | 42.9/42.9/14.3/0 |
| B | 10.49(5%) | 7.27 | 0 | 3.55 | 43.75/43.75/0/12.5 |
| C | 11.52(5%) | 7.97 | 6.82 | 0 | 40/40/20/0 |
| D | 8.64(5%) | 5.98 | 13.64 | 0 | 30/30/40/0 |
| E | 11.52(5%) | 7.97 | 0 | 6.82 | 40/40/0/20 |

| | Polymerization Conditions | | |
|---|---|---|---|
| | Temperature & Time | | |
| Ex. | C.° | Minutes | Pressure |
| A | 285–346 | 37 | Atmospheric |
| | 346 | 7 | Reducing to below 1 mm Hg (133 Pa) |
| B | 270–336 | 40 | Atmospheric |
| | 336 | 5 | Reducing to below 1 mm Hg (133 Pa) |
| C | 283–348 | 60 | Atmospheric |
| | 348 | 12 | Reducing to below 1 mm Hg (133 Pa) |
| D | 283–305 | 90 | Atmospheric |
| | 305 | 25 | Reducing to below 1 mm Hg (133 Pa) |
| E | 283–305 | 45–50 | Atmospheric (2 batches) |
| | 305 | 15–60 | Reducing to below 1 mm Hg (133 Pa) (2 batches) |

| | Polymer Characterizations | | |
|---|---|---|---|
| Ex. | Inherent Viscosity | Solvent | Stick Temperature (°C.) |
| A | 0.82 | A | 260 |
| B | Insoluble | A | 286 |
| C | 2.70 | B | — |
| D | 0.58 | B | — |
| E | 1.05 | B | — |

| | Filament Extrusion | |
|---|---|---|
| Ex. | Melt Temp (°C.) Cell (Spinneret) | Windup Speed (m/min) |
| A | 330 (343) | 549 |
| B | 345 (368) | 549 |
| C | 310 (328) | 183 |
| D | 298 (303) | 549 |
| E | 327 (338) | 549 |

| | Heat Treatment |
|---|---|
| Ex. | Cycle |
| A | RT-200° C./2hr + 200-304° C./7hr + 304° C./7hr |
| B | RT-200° C./2hr + 200-304° C./7hr + 304° C./7hr |
| C | RT-200° C./2hr + 200-304° C./7hr + 304° C./7hr |
| D | RT-280° C./11.5 hr + 280° C./2.5 hr + 280-RT/1.3 hr |
| E | RT-200° C./2hr + 200-304° C./7hr + 304° C./7 hr |

| | Tensile Properties | |
|---|---|---|
| Ex. | As-spun D/T/E/M | Heat Treated T/E/M |
| A | 0.79/3.3/0.9/315 | 13.0/2.8/483 |
| B | 0.79/3.9/1.2/314 | 18.7/4.4/390 |
| C | 0.62/6.1/2.2/363 | 11.6/4.0/306 |
| D | 0.53/3.4/2.3/243 | 14.1/4.1/385 |
| E | 0.82/2.6/1.5/218 | 12.2/5.8/217 |

EXAMPLE 2

Filaments From Copolyesters of Hydroquinone (HQ), Terephthalic Acid (TPA) and 3-Carboxy-4'-hydroxy-benzophenone (3,4'CHB).

| Polymerization Ingredients | | | |
|---|---|---|---|
| | Grams | | Mole % |
| HQ | TPA | 3,4'CHB | HQ/TPA/3,4'CHB |
| 9.18(5%) | 7.48 | 17.06 | 30/30/40 |

| Polymerization Conditions | | |
|---|---|---|
| Temperature, °C. | Time, min | Pressure |
| 283–348 | 65 | Atmospheric |
| 348 | 12 | Reducing to 1 mm Hg (133 Pa) |

| Polymer Characterization | |
|---|---|
| Inherent Viscosity | Solvent |
| 1.20 | B |

| Filament Extrusion | |
|---|---|
| Temperature, °C. Melt (Spinneret) | Wind-up Speed, m/min |
| 358 (410) | 73 |

| Heat Treatment |
|---|
| Cycle |
| RT-200° C./2 hr + 200-304° C./7 hr + 304° C./7 hr |

| Tensile Properties | |
|---|---|
| As-spun D/T/E/M | Heat-treated T/E/M |
| 1.2/3.2/1.7/213 | 9.1/3.7/223 |

EXAMPLE 3

Filaments from Copolyesters of Chlorohydroquinone (CHQ) Terephthalic Acid (TPA) and 3-Carboxy-3'-methyl-4'-hydroxy-benzophenone (3,3'-4'CMHB)

| Polymerization Ingredients | | | |
|---|---|---|---|
| | Grams | | Mole % |
| CHQ | TPA | 3,3'4'CMHB | CHQ/TPA/3,3'4'CMHB |
| 7.55 | 5.22 | 3.05 | 43/43/14 |

| Polymerization Conditions | | |
|---|---|---|
| Temperature, °C. | Time, min | Pressure |
| 260–338 | 40 | Atmospheric |
| 338 | 12 | Reducing to 1 mm Hg (133 Pa) |

| Polymer Characterization | | |
|---|---|---|
| Inherent Viscosity | Solvent | Stick Temperature (°C.) |
| 0.82 | A | 250 |

| Filament Extrusion | |
|---|---|
| Temperature, °C. Melt (Spinneret) | Wind-up Speed, m/min |
| 300/305 | 549 |

| Heat Treatment |
|---|
| Cycle |
| RT-230° C./2 hr + 250° C./2 hr + 270° C./2 hr + 290° C./10 hr |

Tensile Properties

| As-spun D/T/E/M | Heat-treated T/E/M |
| --- | --- |
| 0.49/2.5/0.91/276 | 10.6/3.5/318 |

I claim:

1. Fiber-forming melt-spinnable copolyesters that exhibit optical anisotropy in the melt consisting essentially of Units I, II, IIIA or IIIB having the structural formulas:

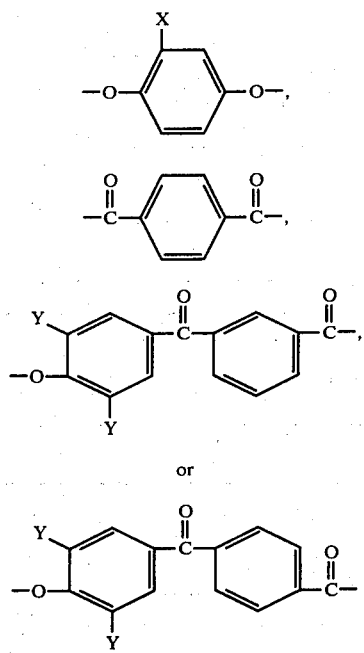

where X is selected from the group consisting of hydrogen, halo or lower alkyl, Y is selected from the group consisting of hydrogen, chloro- and methyl, and wherein said polyesters comprise from about 25 to 45 mole % of Unit I, from about 25 to 45 mole % of Unit II and from about 10 to 50 mole % of Unit IIIA or IIIB, the number of dioxy units in the polyester being substantially equal to the number of dicarbonyl units.

2. Fiber-forming copolyester according to claim 1 consisting of Units I, II and IIIA or IIIB with the proviso that when Unit IIIB is present, X is halo- or 1-4 carbon lower alkyl and Units I and II are each present in the proportion of from 37.5-45 mole % with Unit IIIB constituting the remaining units;

when Unit IIIA is present and X is hydrogen, Units I and II are each present in the proportion of from 27.5-32.5 mole % with Unit IIIA constituting the remaining units; and when Unit IIIA is present and X is halo- or 1-4 carbon lower alkyl, Units I and II are each present in the proportion of from 25-45 mole % with Unit IIIA constituting the remaining units;

in each case, moles of Unit I being substantially equal to moles of Unit II.

3. A filament of a copolyester of claim 1.

4. Fiber-forming copolyester according to claim 2 wherein Units I and II are each present in the proportions of from 37.5-45 mole %; X is chloro or methyl and Unit IIIB constitutes the remaining units.

5. A filament of a copolyester of claim 4.

6. Fiber-forming copolyester according to claim 2 wherein Units I and II are each present in the proportions of from 27.5-32.5 mole %; X is hydrogen and Unit IIIA constitutes the remaining units.

7. A filament of a copolyester of claim 6.

8. Fiber-forming copolyesters according to claim 2 wherein Units I and II are each present in the proportions of from 25-45 mole %; X is chloro or methyl and Unit IIIA constitutes the remaining units.

9. A filament of a copolyester of claim 8.